(12) United States Patent
Bratten

(10) Patent No.: US 7,338,606 B2
(45) Date of Patent: Mar. 4, 2008

(54) ARRANGEMENT AND METHOD FOR MAINTAINING A MINIMUM FLOW VELOCITY IN THE COOLANT RETURN OF A MACHINE TOOL COOLANT FILTRATION SYSTEM

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 0 days.

(21) Appl. No.: 11/523,193

(22) Filed: Sep. 19, 2006

(65) Prior Publication Data

US 2007/0007216 A1    Jan. 11, 2007

Related U.S. Application Data

(62) Division of application No. 10/783,969, filed on Feb. 20, 2004, now Pat. No. 7,172,689.

(51) Int. Cl.
*B01D 36/00* (2006.01)
(52) U.S. Cl. .................. 210/741; 210/137; 210/418; 210/428; 210/434; 210/167.02; 210/767; 137/484.2; 137/544; 137/563
(58) Field of Classification Search .................. None
See application file for complete search history.

(56) References Cited

U.S. PATENT DOCUMENTS

| | | | | |
|---|---|---|---|---|
| 2,652,737 A | * | 9/1953 | Longstreet | 82/152 |
| 3,604,534 A | * | 9/1971 | Whitaker | 184/6 |
| 3,618,707 A | * | 11/1971 | Sluhan | 184/109 |
| 3,750,847 A | * | 8/1973 | Sluhan | 184/109 |
| 3,897,335 A | * | 7/1975 | Brandt | 210/774 |
| 4,076,442 A | * | 2/1978 | Cox et al. | 408/8 |
| 4,325,663 A | * | 4/1982 | Lee | 409/136 |
| 4,345,668 A | * | 8/1982 | Gaunt | 184/29 |
| 4,655,940 A | * | 4/1987 | Harms | 210/805 |
| 4,861,494 A | * | 8/1989 | Bratten | 210/739 |
| 5,223,156 A | * | 6/1993 | Maier | 210/800 |
| 5,224,051 A | * | 6/1993 | Johnson | 700/169 |
| 5,230,793 A | * | 7/1993 | Lenhart et al. | 210/167.31 |
| 5,262,071 A | * | 11/1993 | Tuck | 210/805 |
| 5,346,629 A | * | 9/1994 | Wuller | 210/739 |
| 5,380,446 A | * | 1/1995 | Bratten | 210/805 |
| 5,417,849 A | * | 5/1995 | McEwen et al. | 210/109 |
| 5,466,380 A | * | 11/1995 | Bratten | 210/741 |
| 5,575,307 A | * | 11/1996 | Martinitz et al. | 137/205 |
| 5,582,740 A | * | 12/1996 | McEwen et al. | 210/744 |
| 5,590,678 A | * | 1/1997 | Martinitz | 137/205 |
| 5,593,596 A | * | 1/1997 | Bratten | 210/741 |
| 5,595,462 A | * | 1/1997 | Hensley | 409/132 |
| 5,800,104 A | * | 9/1998 | Miyano | 409/131 |

(Continued)

*Primary Examiner*—Robert James Popovics
(74) *Attorney, Agent, or Firm*—John R. Benefiel

(57) ABSTRACT

An arrangement and method for maintaining a minimum flow velocity in return piping receiving dirty coolant from a plurality of machine tools receiving filtered coolant from a filter apparatus. A bypass line diverts clean coolant into the return piping via a pressure reducing valve set to allow make up flow of clean coolant into the return piping just sufficient to maintain a pressure corresponding to the minimum flow velocity in the return piping. A pressure maintaining valve is interposed upstream of the pressure reducing valve and set to restrict flow as necessary to maintain adequate pressure to insure that the machine tools are adequately supplied with clean coolant at start up prior to the beginning of contaminated flow in the return piping.

6 Claims, 1 Drawing Sheet

U.S. PATENT DOCUMENTS

| | | | | |
|---|---|---|---|---|
| 5,975,108 A * | 11/1999 | Cho | ............................ | 137/205 |
| 5,980,735 A * | 11/1999 | Bratten | ........................ | 210/87 |
| 5,983,910 A * | 11/1999 | Berger et al. | ............. | 134/104.4 |
| 6,017,446 A * | 1/2000 | Harms et al. | ........... | 210/167.02 |
| 6,148,846 A * | 11/2000 | Schell | ......................... | 137/208 |
| 6,241,432 B1 * | 6/2001 | Sasanecki | ..................... | 408/56 |
| 6,322,694 B1 * | 11/2001 | Iliadis et al. | ............ | 210/167.01 |
| 6,425,715 B1 * | 7/2002 | Sasanecki | ..................... | 408/56 |
| 6,435,198 B2 * | 8/2002 | Berger et al. | ................. | 134/63 |
| 6,447,573 B1 * | 9/2002 | Rake | ............................ | 95/10 |
| 6,460,549 B2 * | 10/2002 | Berger et al. | ................. | 134/60 |
| 6,508,944 B1 * | 1/2003 | Bratten | ........................ | 210/805 |
| 6,708,737 B1 * | 3/2004 | Bratten | ........................ | 141/86 |
| 6,911,142 B2 * | 6/2005 | Pahl et al. | .............. | 210/167.01 |
| 6,932,856 B2 * | 8/2005 | Rake | ............................. | 95/10 |
| 6,938,633 B2 * | 9/2005 | Sugata et al. | ................... | 137/1 |
| 7,172,689 B2 * | 2/2007 | Bratten | ........................ | 210/137 |
| 2002/0081167 A1 * | 6/2002 | Sasanecki | ..................... | 408/56 |
| 2003/0183562 A1 * | 10/2003 | Pahl et al. | ................... | 210/103 |
| 2004/0065384 A1 * | 4/2004 | Bratten | ........................ | 141/86 |
| 2005/0160571 A1 * | 7/2005 | Kuhn et al. | ................ | 29/407.1 |
| 2006/0060545 A1 * | 3/2006 | Bratten | ........................ | 210/805 |
| 2007/0007216 A1 * | 1/2007 | Bratten | ........................ | 210/741 |

\* cited by examiner

ARRANGEMENT AND METHOD FOR MAINTAINING A MINIMUM FLOW VELOCITY IN THE COOLANT RETURN OF A MACHINE TOOL COOLANT FILTRATION SYSTEM

CROSS REFERENCE TO RELATED APPLICATION

This application is a divisional of U.S. Ser. No.: 10/783,969, filed Feb. 20, 2004, now U.S. Pat. No. 7,172,689.

BACKGROUND OF THE INVENTION

This invention concerns central filtration apparatus supplying filtered coolant to a plurality of machine tools. Machine tools typically are supplied with a flow of machining coolant which is directed through nozzles at the cutting tools and machined parts to lubricate and cool the cutting tools as the machining process proceeds.

The filtration apparatus is provided to filter the returned coolant and supply an adequate flow to all of the machine tools at a proper pressure.

The used coolant drains down into an individual sump located beneath each machine tool, which is equipped with a float control and pump to pump the used coolant back through a common return pipe to the filtration apparatus.

The coolant also washes away cutting chips and other solid material generated by the machining process, such as grinding swarf. Coolant and entrained solids flowing through the return pipe must be under sufficient pressure in order to insure that a sufficient minimum flow velocity is maintained along the length of the return pipe such that the solids are carried along with the coolant in the return pipe. If the flow velocity is too low, the entrained solids may settle out and create blockages.

Different types of machining operations produce solids of different densities such that different minium velocities must be maintained according to the type of solids being generated.

Piping of different sizes and configurations used for the coolant return also affect the minimum flow velocities necessary. In large scale installations with large flow volumes and large diameter pipes, the losses are low such that it is easier to maintain sufficient velocities due to the mass of the flowing liquid. Sloping of the return piping may be adequate to maintain the proper velocities.

However, in smaller installations, particularly with multiple turns and other restrictions, maintaining sufficient flow velocities is more difficult due to the much higher losses.

Another complication, particularly in small installations, is the considerable variations in system operating conditions which occur, such as during start up and the substantial effects of having one or more machine tools not operating at any given time. There may occur system conditions where one or more the machine tools are not pumping any dirty coolant into the return so that sufficient coolant flow in the return is not present to maintain the required minimum velocity of the return flow.

While clean coolant could simply be directed into the return piping via a bypass connection to maintain the flow velocities above the minimum level required, this would increase the required capacity of the central filtration apparatus as a significant portion of the filtered coolant would not be available for use by the machine tools.

Also, if a large flow of clean coolant is diverted into the return piping, elevated pressures therein requires increased sump pump output since dirty coolant must be introduced into the return piping at an elevated pressure. Larger piping networks would also be necessitated, further increasing the cost of the installation.

In order to deal with these variable conditions, the practice has in the past typically been to collect the flow from all of the sumps in a large auxiliary tank, with a separate additional pump used to pump coolant collected in the auxiliary tank back to the filtration apparatus. This additional equipment is a significant part of the cost of the system, particularly as a back up pump is often specified to be available if the first pump fails in order to reach a higher operating reliability.

Accordingly, it is the object of the present invention to provide an arrangement for insuring minimum flow velocities in the return piping for machine tool coolant filtering systems where maintaining a minimum flow velocity is difficult, over a wide range of varying system operating conditions.

It is another object of the invention to provide such an arrangement which does not entail any increase in the capacity of the filtering apparatus or sump pump sizes and without requiring any additional tanks or pumps.

SUMMARY OF THE INVENTION

These and other objects of the present invention which will become apparent upon a reading of the following specification and claims are achieved by providing a branch pipe from the clean coolant supply to the return piping via a pressure control valving arrangement which insures that a make up flow of clean coolant is introduced into the return piping just sufficient to maintain the minimum flow velocity in the return piping.

The pressure control valving arrangement includes a pressure reducing valve connected upstream of the return piping which is set to maintain a predetermined calculated or empirically determined minimum pressure in the return line which is necessary to maintain minimum flow velocities in the return piping of the particular system.

Thus, only the minimum diversion of clean coolant into the return line occurs to automatically introduce only that clean coolant flow required to just make up any temporary difference in return flow from the machine tools.

The pressure control valving arrangement further includes a pressure maintaining valve upstream of the pressure reducing valve set to close when upstream pressure in the coolant supply line drops to the minimum pressure required to properly supply coolant to the machine tools.

An excessive diversion of clean coolant such as to create an insufficient pressure of coolant to the machine tools is avoided by closing of the pressure maintaining valve to prevent flow of clean coolant into the return line via the pressure reducing valve even if the return piping is unpressurized at that time. This will not create a blockage problem since no dirty coolant is being pumped into the return piping when low pressure conditions exist in the return piping, as when the sumps are being filled at start up. Since no dirty coolant is being pumped into the return piping at this time, no clog up can occur.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
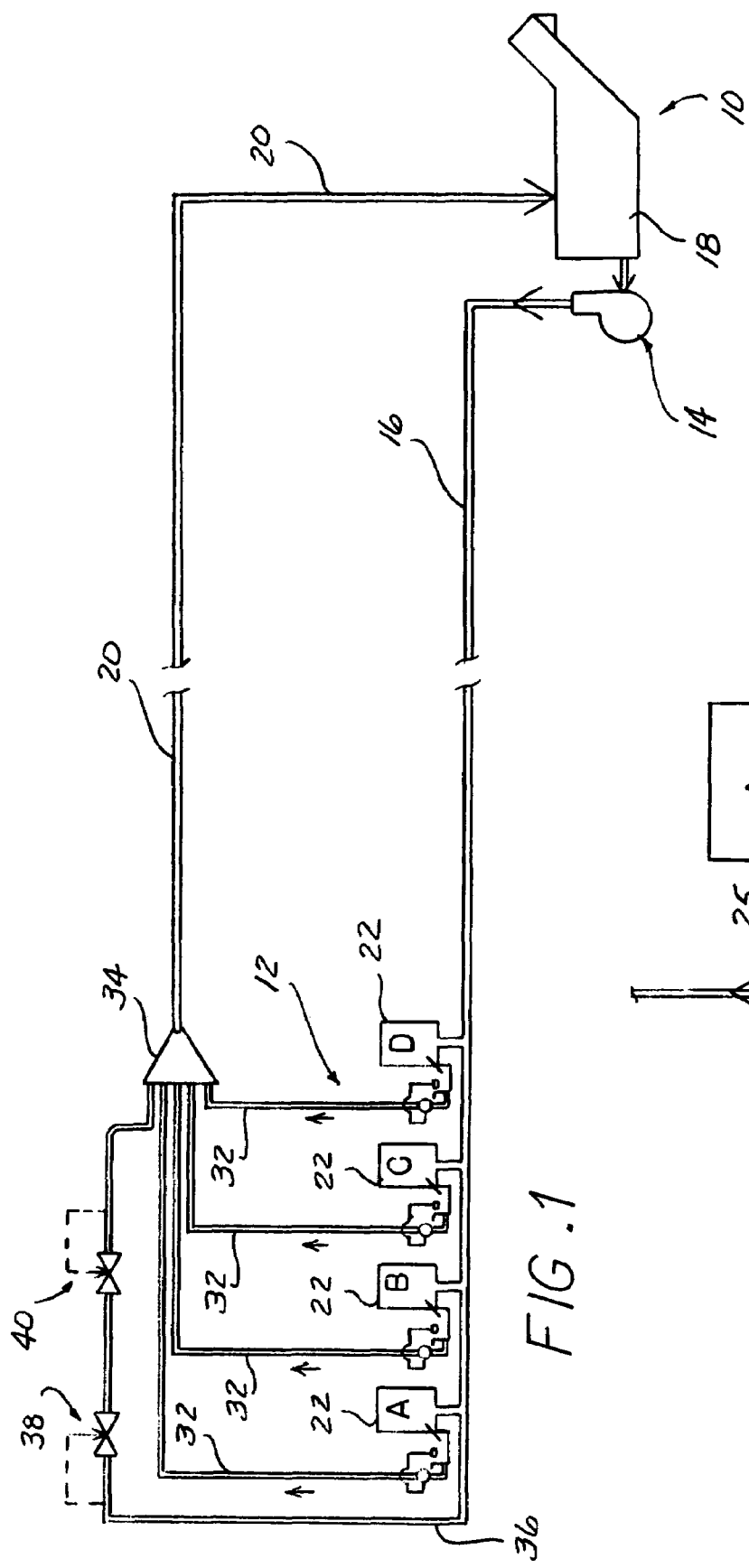
FIG. 1 is a diagrammatic representation of a machine tool filtration system and a machine tool installation connected thereto.

Referring to the drawings, and particularly FIG. 1, a centralized filtration apparatus 10 produces filtered machine tool coolant which is supplied under pressure to a machine tool installation 12 by a centrifugal pump 14 via supply piping 16. The filtration apparatus 10 may be of a type in wide use for this application in which dirty coolant is introduced into a tank 18 through a return pipe 20.

This contaminated coolant containing machining debris solids is drawn through a belt media periodically indexed over a perforate plate covering a vacuum chamber (not shown). Operation of the pump 14 connected to the vacuum chamber creates a vacuum causing the coolant to be drawn through the media to thereby be cleaned, which then is recirculated to the machine tools via piping 16.

The pump 14 and filter apparatus 10 are sized to provide a flow of clean coolant to the machine tools 20A, B, C, D adequate for the particular machining processes, i.e., 400 gallons per minute at 55 psi for example. Each machine tool would typically require 100 gallons per minute at 45 psi in this example.

This type of apparatus is well known in the industry and does not in itself comprise the present invention such that further details are not here set out.

The machine tool installation 12 is comprised of several machine tools 22A, B, C, D, each supplied with filtered coolant via individual branches included in the supply piping 16. The coolant is used by being directed at the workpiece surface being machined with cutting tools to facilitate the machining process.

Figure 2:
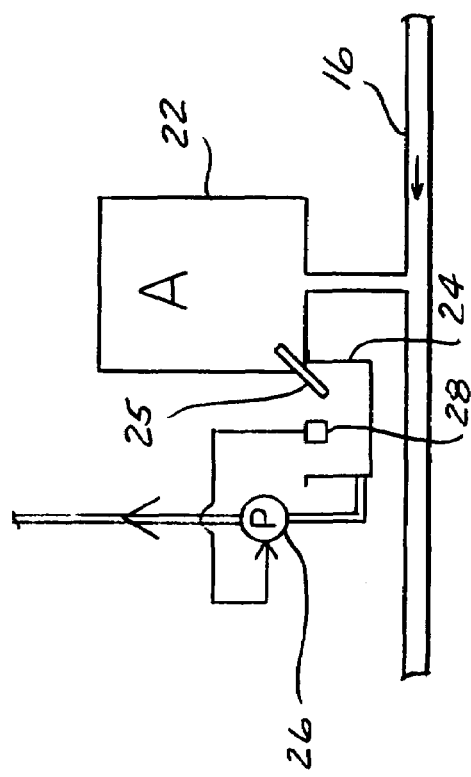
FIG. 2 is an enlarged diagrammatic representation of the system components associated with each machine tool components.

The coolant flushes away the chips, and other solid debris such as grinding swarf, etc., and the coolant and entrained solids drain down into an associated sump 24 over shed plates 25 where they are collected (FIG. 2).

Each sump 24 has an associated sump pump 26 turned on and off by operation of a level control device 28 maintaining a predetermined level of drained coolant in the sump 24.

Each sump pump 30 pumps the dirty coolant out of the sump 24 via an outlet pipe 32 to a return piping manifold 34 where the flow from each sump enters the return piping 20 to be directed back to the filtration apparatus 10.

This arrangement is typical of centralized coolant filtration systems supplying a plurality of machine tools.

According to the concept of the present invention, a make up flow of clean coolant is caused to be controllably introduced into the return pipe 20 via a bypass line 36 connected to the main supply piping 16 and to the return piping manifold 34 via a pressure control valving arrangement constituted by a pressure sustaining valve 38 and a pressure reducing valve 40.

The pressure reducing valve 40 is of a commercially available type which automatically maintains an adjustably preset downstream pressure regardless of variations in the inlet pressure or flow rates. The pressure to be maintained is predetermined for any given installation as by calculation and/or testing is that pressure which will produce the minimum flow velocity of the coolant in the return piping necessary for that installation. That is, the pressure required at the return header 34 will vary with the length and diameter of the return piping 20 due to the resulting variations in the pressure losses due to friction, turns and other restrictions, to maintain the minimum velocity in the return piping 20. Whatever that pressure is determined to be, the valve 40 is preset to maintain that pressure level. This would typically be at a pressure of 4 or 5 psi in a typical system.

Thus, if the combined flow from all of the sump pumps 26 is not sufficient to create the necessary pressure at the header 34, a make up flow of clean coolant is automatically introduced at the header 34 of a volume just sufficient to increase the pressure level to that predetermined to be required.

The pressure reducing valve 40 is used to precisely control the make up flow to avoid excessive diversion of clean coolant into the return piping 20 which might otherwise occur.

The pressure maintaining valve 38 prevents excessive diversion of coolant during high flow demand with all of the machines running, when low pressure conditions in the return piping 16 prevails.

For example, at start up, maximum flow to the machine tools 22 may occur if all of the tools A, B, C, D are turned on. At the same time, each sump 24 needs to be filled before dirty coolant flow begins to enter the return piping 20 so that very low or zero pressure exists in the return piping. Thus, pressure reducing valve 40 will open to a maximum opening to attempt to pressurize the return piping 20. Thus, a large flow of clean coolant in the return piping 20 would occur at initial start up or possibly at other times, and pressure to the machine tools A, B, C, D might fall below the level necessary to provide adequate flow thereto, i.e., 45 psi at each machine tool 22.

A make up flow in the return piping 20 is not necessary at that time since no entrained solids are yet being introduced therein so that clogging cannot occur.

The pressure maintaining valve 38 is therefore set to close at the minimum pressure required in the supply piping 16 to insure proper flow to all of the machine tools, i.e., 45 psi. Thus, coolant flow is prevented from reaching the pressure reducing valve 40, and thus no make up flow of clean coolant is diverted to the return piping 20.

After normal conditions are reached and pressure in the supply piping 16 again exceeds 45 psi, pressure maintaining valve 38 will again open to allow the volume make up flow as necessary to compensate for fluctuations in the total flow of coolant in the return piping 20.

The cost of the two valves 38, 40 (which are pressure operated and do not require wiring or controls), is much lower than increasing sump pump sizes or than adding an additional pump and the auxiliary tank, and are quite reliable over an extended service life.

The arrangement can be tailored to a wide variety of installation configurations, and does not utilize a significant fraction of the capacity of the filter apparatus 10 so that the filter apparatus need be sized to provide only that capacity necessary to serve the machine tools.

The invention claimed is:

1. A method of maintaining a minimum flow velocity in a return piping of a centralized machine tool coolant filtration system for a plurality of machine tools which each are supplied with coolant from a filtration apparatus and each of which collect contaminated coolant containing entrained solids which is directed under pressure into said return piping, said minimum flow velocity alone said return piping comprising that flow velocity which is sufficient to carry said entrained solids in the coolant from the machine tools, along said return piping comprising the steps of:

diverting a make up flow of filtered coolant from a filtration apparatus included in said system into said return piping; and, controlling said make up flow of filtered coolant to be at a flow rate just sufficient to substantially maintain said minimum flow velocity therein so as to carry said solids with the flow of said coolant in said return piping, by sensing the pressure of contaminated coolant directed into said return piping and diverting a flow of filtered coolant from said filtration apparatus into said return piping so as to substantially maintain the pressure of said contaminated coolant introduced into said return piping to that pressure corresponding to said minimum flow velocity.

2. The method according to claim 1 wherein said step of diverting said make up flow is carried out by interposing a pressure reducing valve upstream of said return piping to receive said make up flow and setting said pressure reducing valve to substantially maintain a downstream pressure corresponding to the pressure required to substantially maintain said minimum flow velocity in said return piping.

3. The method according to claim 2 wherein said pressure setting of said pressure reducing valve is determined in part by determining the pressure losses in said return piping at said minimum flow velocity.

4. The method according to claim 1 further including the step of reducing the diversion of make up coolant flow from said filtration apparatus as necessary to maintain adequate pressure of coolant supplied to said machine tools notwithstanding the decline of said pressure in said return piping below that corresponding to said minimum flow velocity.

5. The method according to claim 4 wherein said step of preventing any diversion of make up coolant flow to said return piping is carried out by interposing a pressure sustaining valve in a filtered coolant supply piping to said return piping set to a minimum pressure level necessary to supply said machine tools with coolant.

6. The method according to claim 1 wherein said return piping pressure maintained is on the order of 4-5 psi.

* * * * *

UNITED STATES PATENT AND TRADEMARK OFFICE
CERTIFICATE OF CORRECTION

PATENT NO. : 7,338,606 B2  
APPLICATION NO. : 11/523193  
DATED : March 4, 2008  
INVENTOR(S) : Jack R. Bratten Page 1 of 1

It is certified that error appears in the above-identified patent and that said Letters Patent is hereby corrected as shown below:

Column 5, line 2, delete "alone" and insert -- along --.

Signed and Sealed this

Twenty-seventh Day of May, 2008

JON W. DUDAS  
*Director of the United States Patent and Trademark Office*